June 29, 1971     C. S. THOMPSON ET AL     3,588,966
CONNECTOR AND METHOD OF MAKING SAME
Filed April 3, 1969     2 Sheets-Sheet 1
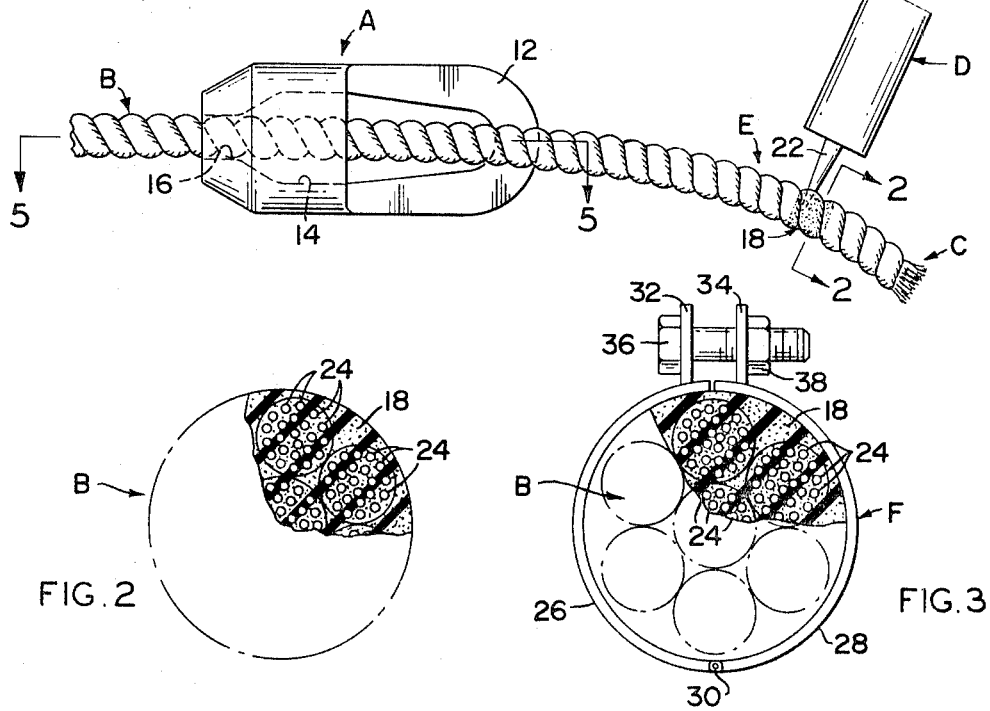
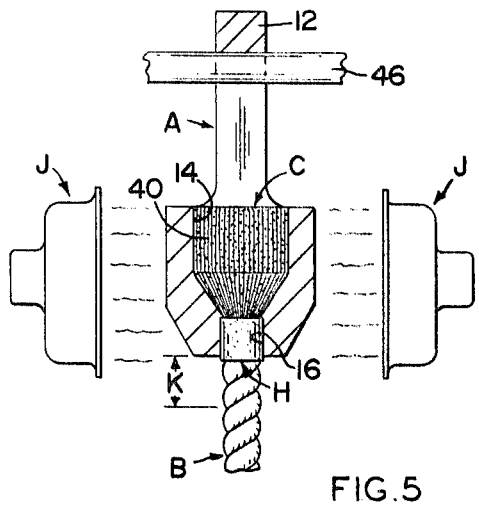
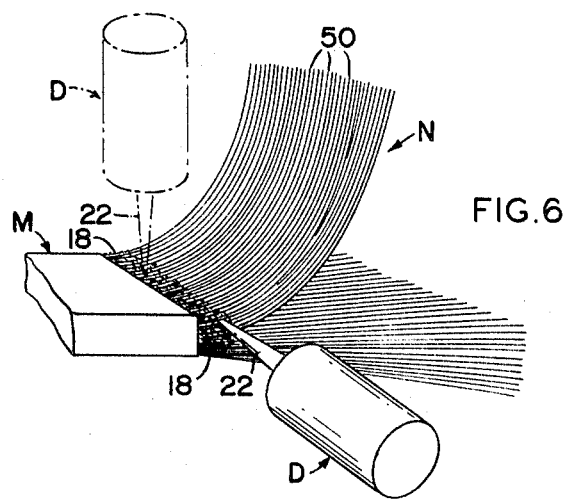
INVENTORS.
CHARLES S. THOMPSON
WILLIAM E. PETRANSKY
PAUL D. REID
BY
Meyer, Tilberry & Body
ATTORNEYS.

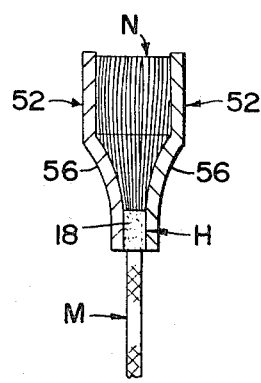
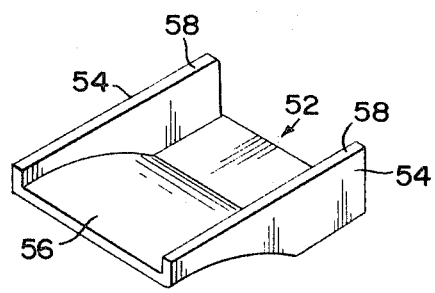
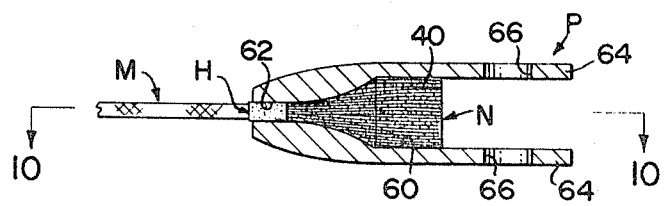
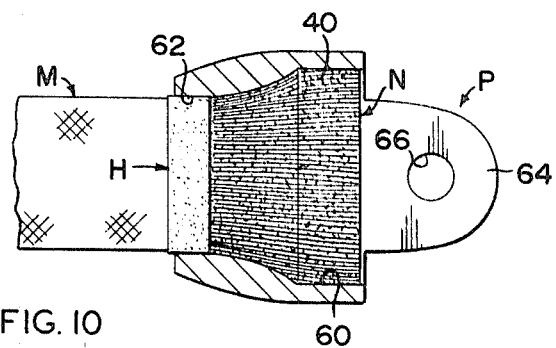

United States Patent Office 3,588,966
Patented June 29, 1971

3,588,966
CONNECTOR AND METHOD OF MAKING SAME
Charles S. Thompson, Vincentown, N.J., and William E. Petransky, Lansdowne, and Paul D. Reid, Philadelphia, Pa., assignors to Gulf + Western Industrial Products Company, Grand Rapids, Mich.
Filed Apr. 3, 1969, Ser. No. 812,983
Int. Cl. F16g 11/00; B23p 25/00
U.S. Cl. 24—123
14 Claims

ABSTRACT OF THE DISCLOSURE

An elongated flexible element, such as a rope, has an enlarged connector lug molded on its end. The lug is molded by positioning the end of the flexible element in a mold and having the end of the element impregnated with hardenable material such as thermo-setting epoxy resin. The elongated flexible element is impregnated with elastomeric material at its point of exit from the mold so that the lug material cannot leak from the mold.

BACKGROUND OF THE INVENTION

This application pertains to the art of connectors and more particularly to molded connectors for ropes or the like. The invention is particularly applicable to connectors of the type including an enlarged molded lug on the end of a rope and will be described with particular reference thereto although it will be appreciated that the invention has broader applications and can be used to prevent leakage of molding material from a mold when forming other things than connector lugs on a rope or tape.

Molded connector lugs are known in many prior U.S. patents such as La Garde 3,263,289; La Garde 3,264,017; and La Garde et al. 3,333,310. In these prior arrangements, a rope or tape formed from a plurailty of individual strands is unwoven at one end. The unwoven strands at the one end are completely coated with a hardenable material such as epoxy resin. The end of the rope or tape is then placed in a mold where the hardenable material is hardened to a desired shape which forms an enlarged lug on the end of the rope or tape. The mold includes an opening through which the rope or tape extends while its end is being molded with a lug. The mold may itself define a metal connector which is to be left on the end of the rope or tape for connecting the rope or tape to another device. The lug may also be molded in a first mold and then be removed for positioning in a metal connector. In use of the device, that portion of the rope or tape immediately adjacent its exit point from the connector defines a flexure area. In previous molding procedures, some of the hardenable material would run along the rope or tape, both interiorly and exteriorly, into the flexure area of the rope or tape. Hardening of the material on the strands of the rope or tape in the flexure area makes the strands rigid in this area. When this occurs, the strands are brittle in the flexure area and are easily broken when a flexing stress is applied to them.

Therefore, it would be desirable to mold connector lugs of the type described in such a manner that strands in the able material through the opening in the mold.

SUMMARY OF THE INVENTION

In accordance with the present invention, an enlarged connector lug is molded on the end of a rope. The end of the rope is first impregnated with a hardenable material in a liquid state. The end of the rope is then positioned in a mold where the hardenable material is hardened to a desired shape. In order to prevent leakage of the hardenable material from the mold, a portion of the rope is first impregnated with elastomeric material to to form an elas- tomeric plug on the rope. This plug is positioned at the exit opening from the mold so that the hardenable material cannot leak past the plug. The elastomeric material is applied to both the internal and external strands of the rope so that the hardenable material cannot leak past the elastomeric plug either internally or externally of the rope. By preventing leakage of the hardenable material, the rope strands exterior of a metal connector in which the enlarged lug is positioned remain highly flexible so that they do not break.

It is a principal object of the present invention to provide an improved molded lug or connection for ropes or tapes made from a plurality of individual strands.

It is also an object of the present invention to provide an improved method for forming molded lugs or connections on ropes or tapes made from a plurality of individual strands.

It is a further object of the present invention to provide an improved molded connector for a rope or tape by preventing leakage of hardenable lug material from the mold while a lug is being molded.

It is a further object of the present invention to provide an improved molded connection on a rope or tape by eliminating brittle strands at a flexure point adjacent the molded lug or connector.

BRIEF DESCRIPTION OF THE DRAWING

The invention may take physical form in certain parts and arrangements of parts, a preferred embodiment of which will be described in detail in this specification and illustrated in the accompanying drawings which form a part hereof.

FIG. 1 is a side elevational view of a connector and rope showing the first operation in forming the improved connector of the present invention;

FIG. 2 is a cross-sectional view taken on line 2—2 of FIG. 1;

FIG. 3 is a the same view as FIG. 2 and further including a mold positioned around a rope to form an elastomeric plug;

FIG. 4 is a side elevational view showing a rope having the improvement of the present invention embodied therein;

FIG. 5 is a cross-sectional view looking in the direction of arrows 5—5 of FIG. 1 and with the rope and lug not shown in section for clarity of illustration;

FIG. 6 is a perspective view showing the first operation in forming the improved connector of the present invention on a flat woven tape;

FIG. 7 is a side elevational cross-sectional view showing the tape of FIG. 6 positioned in a mold;

FIG. 8 is a perspective view showing a mold which may be used in the arrangement of FIG. 7;

FIG. 9 is a side elevational cross-sectional view showing the tape of FIG. 6 positioned in a connector; and FIG. 10 is a cross-sectional view looking in the direction of arrows 10—10 of FIG. 9.

DESCRIPTION OF THE PREFERRED EMBODIMENT

Referring now to the drawings, wherein the showings are for purposes of illustrating a preferred embodiment of the invention only and not for purposes of limiting same, FIG. 1 shows a connector A having a rope B extending therethrough. Connector A includes a loop portion 12 for connecting connector A to a hook or pin, or another device in use of rope B for towing something. Connector A has an internal socket portion 14 and a throat portion 16 which defines an exit opening from socket 14 in connector A.

End C of rope B is fed through throat 16 and a socket 14 until a free length of rope B extends from loop end 12 of connector A as shown in FIG. 1. A tube D of elastomeric material is then used to completely coat a portion of rope B with elastomeric material 18 at a predetermined distance from rope end C. Tube D includes a nozzle 22 which is forced into the interior or rope B at a plurality of different places around the circumference of rope B. Elastomeric material 18 is also spread around the exterior of rope B. In this fashion, elastomeric material 18 completely coats the interior and exterior yarns of rope B.

Elastomeric material 18 may be RTV silicone rubber which is curable at room temperature. It would also be recognized that elastic material 18 may be a soft natural or neoprene rubber which is vulcanizable. As shown in FIG. 2, all of the yarns 24 in rope B are surrounded by elastomeric material 18 so that there are substantially no spaces between adjacent yarns. That portion of rope B which is impregnated with elastomeric material 18 may then be placed in a mold F as shown in FIG. 3. Mold F may be defined by two arcuate portions 26 and 28 connected together by pivot pin 30. Suitable ears 32 and 34 on arcuate sections 26 and 28 may have holes or slots receiving a bolt 36 which cooperates with a nut 38 to clamp sectors 26 and 28 around the impregnated portion of rope B. This step also compresses elastomeric material 18 and forces it into any spaces between adjacent yarns 24 of rope B. Obviously, many other types of molds may be used for this purpose. In one arrangement, rope B may be pulled rearwardly through connector A until rope end C is positioned in socket 14 and that portion of rope B which is impregnated with elastomeric material 18 is positioned in throat portion 16. The elastomeric material may then be cured while it is positioned within throat portion 16. If elastomeric material 18 is air curable, it is simply allowed to cure while positioned in a mold. If elastomeric material 18 is heat curable, a suitable source of heat may be applied to the mold for curing the elastomeric material.

Following the above steps, rope B has an elastomeric plug H formed thereon. The yarns of rope end C are then combed out and all of the strands are coated with a solidifiable material 40. The procedure for coating all of the strands with solidifiable material 40 is fully described in the aforementioned La Garde Pat. 3,263,289. Solidifiable material 40 may be a thermo-setting epoxy resin which is curable to a substantially rigid state.

Rope B is then pulled rearwardly through connector A until elastomeric plug H is positioned in throat portion 16 of connector A and rope end C is positioned within socket portion 14 of connector A. The position of the various portions is then as shown in FIG. 5. In one arrangement, mold F of FIG. 3 has an internal diameter which is slightly larger than the diameter of throat portion 16 of connector A so that elastomeric plug H is a very tight fit within throat portion 16. In other arrangements, mold F may be tapered so that elastomeric plug H will be wedged within throat portion 16 as rope B is pulled rearwardly through connector A. In an arrangement where elastomeric plug H is molded within throat portion 16, it will fit within throat portion 16 very snugly. A suitable source of heat J is then applied to connector A to cure solidifiable material 40 to a substantially rigid state.

It will be recognized that rope end C defines a connector portion of rope B which is completely impregnated with solidifiable material 40. It should also be recognized that the juncture between elastomeric plug H and the yarns of rope end C defines a juncture portion of rope B, at which juncture portion yarns of rope B which are not impregnated with solidifiable material 40, merge into yarns of rope B which are impregnated with solidifiable material 40.

In solidifying material 40 by heat source J, loop 12 of connector A may be placed over a horizontal rod 46 so that connector A is in a vertical position with rope B hanging vertically downward. With elastomeric plug H in tight engagement with throat portion 16 and also filling the spaces between adjacent yarns, leakage of solidifiable material 40 into yarns of rope B exteriorly of connector A, as represented by portion K in FIG. 5, is prevented. It should be emphasized that elastomeric plug H prevents leakage of solidifiable material both interiorly and exteriorly along the yarns of rope B into rope portion K. When rope B is placed in use with connector A, rope portion K of FIG. 5 defines a flexure area when rope B is bent laterally relative to connector A. When solidifiable material 40 is allowed to leak into rope portion K, the yarns in portion K are very brittle and are easily broken when flexed. In previous arrangements, where elastomeric plug H was not used, rope B was sometimes pulled rearwardly through connector A too far after end C had been impregnated with solidifiable material 40. In such arrangements, a substantial portion of rope B exteriorly of connector A was impregnated with solidifiable material 40 within rope portion K. Therefore, elastomeric plug H also prevents pulling rope B rearwardly through connector A too far and prevents brittle yarns in rope portion K exteriorly of connector A.

It will be recognized that rope B may be woven, braided, or defined by a plurality of straight bundled yarns covered with a protective sheath such as a braided or extruded cover. In situations where the rope has a braided or extruded cover, the cover may be cut away so that the elastomeric material may be inserted into the yarn as described with reference to FIG. 1. In situations where rope B is woven, it will be understood that there is an intersecting portion defined by woven yarns merging into unwoven yarns at end C. In such situations, this intersecting portion of woven and unwoven yarns coincides with the juncture portion previously described, and defined as the merging of yarns uncoated with solidifiable material 40 into yarns coated with solidifiable material 40.

In applying the present invention to tightly woven flat elongated tapes of the type described in the aforementioned La Garde Pat. 3,263,289, the weave may be too tight to force elastomeric material into the woven portion. In such situations, an elastomeric material having a very low viscosity may be applied to a woven portion of the tape and allowed to seep in to coat all of the yarns. In addition, it is possible to place a woven portion of such a tape in a mold and force elastomeric material into it under pressure. In a preferred arrangement, a woven tape M has its yarns 50 at a terminal end N unwoven and combed out. Yarns 50 are then spread apart while nozzle 22 of tube D is moved about to spread elastomeric material 18 thoroughly throughout the yarns at the juncture between woven and unwoven yarns. Some of the elastomeric material will coat yarns which are still woven. Tape M may then be placed within mold halves 52, as shown in FIG. 7, to cure elastomeric material 18 and form elastomeric plug H. Mold halves 52 may take the form as shown in FIG. 8 and be two identical halves. Mold 52 includes side flanges 54 and a curved main portion 56. Straight edges 58 of flanges 54 on two mold halves 52 are placed in contact and suitably clamped together to cure elastomeric plug H. End N of tape M is then removed from the mold and impregnated with solidifiable material 40. Tape M is then pulled rearwardly through a connector P. Connector P includes a socket portion 60 and throat portion 62. Connector P may include ears 64 having holes 66 therethrough for receiving a pin or the like to attach connector P to another device. Solidifiable material 40 may then be cured by applying heat as described with reference to FIG. 5. Elastomeric plug H prevents having any brittle fibers exterior of connector P in the flexure area of tape M.

It will be recognized that rope B or tape M has a substantially uniform cross-section throughout its length and the lug formed by curing solidifiable material 40 on rope end C or tape end M provides a connector portion of substantially greater cross-sectional area than the rest of the rope or tape.

The present invention is particularly applicable to use with ropes or tapes made of material such as nylon or the like, although it is useful with ropes, tapes or cables of other materials including glass and metal.

In ropes or tapes which are formed of nylon or such materials, a plurality of yarns or strands are interwoven, braided or bundled together. Each yarn or strand is also made up of a plurality of twisted fibers or threads. The fibers or threads of each yarn or strand are very tightly bunched so that leakage of solidifiable material 40 along the threads or fibers of an individual yarn or strand is not usually a problem. Therefore, elastomeric material 18 prevents leakage of solidifiable material 40 exteriorly of a connector or mold even though the elastomeric material does not impregnate each fiber or thread of each yarn. However, it is desirable that elastomeric material 18 fill the spaces between adjacent yarns as these are often quite losely bunched. In situations where the end of a rope or tape is first unwoven and combed prior to application of elastomeric material 18, elastomeric material 18 may impregnate substantially all of the fibers or threads of each individual yarn or strand as well as filling the spaces between adjacent yarns or strands. Therefore, by the term "impregnated" is meant situations where only the spaces between yarns or strands is occupied by elastomeric material and not the fibers or threads of each yarn or strand, or situations where the fibers or threads of each yarn are coated with elastomeric material as well as the spaces between yarns.

With reference to FIG. 1, it will be recognized that it is sometimes possible to apply a vulcanizable elastomeric material 18 to rope B and to then impregnate end C with solidifiable material 40 prior to vulcanization of elastomeric material 18. In such a procedure, positioning of the various portions as shown in FIG. 5 would have both solidifiable material 40 and elastomeric plug H in an uncured state so that both elastomeric plug H and solidifiale material 40 are cured simultaneously by heat source J. In such an arrangement, the uncured elastomeric material is sufficiently viscous so that it does not leak any great extent into rope portion K of FIG. 5 during the curing operation. Any leakage which does occur is immaterial because no harm is done by having highly flexible elastomeric material coating the yarns in rope portion K.

In some situations, it is possible to use a highly viscous grease, such as silicone grease, in place of curable elastomeric material. In such applications, the grease is impregnated into a portion of the rope or tape as described with reference to FIGS. 1 and 6. The grease then prevents leakage of hardenable material 40 during the curing step and also provides an identifying area so that the rope or tape is not pulled rearwardly through the mold or connector too far to expose yarns impregnated with solidifiable material to an exterior portion of the connector or mold. While such grease may eventually evaporate or wash away from rain and exposure in later use of the rope or tape, it will have served its purpose in preventing formation of brittle fibers along the rope or tape in its flexure area. It is also possible to add the grease subsequent to the step of impregnating the yarns with epoxy but prior to curing, although this is not the preferred procedure.

It will also be recognized that the present invention may be used in situations where two ropes are joined together by interdigitating end yarns of two ropes and impregnating them with thermo-setting epoxy resin. The present invention is also useful where a rope or the like is formed into a loop to define an eyelet and a free end is joined to a body portion of the rope by a molded lug. In such situations, a metal connector may not be used to receive the lug. Even in such situations the present invention provides a sharp and well defined juncture between the rigid inflexible lug and a flexure portion of the rope. Thus, the lug is strong and thick enough to prevent flexure of yarns coated with solidified epoxy and the only yarns which flex are uncoated. Leakage of epoxy away from the main lug provides yarns with insufficient epoxy to prevent flexure, and flexure of such yarns causes yarn rupture because they are brittle when rigidified by hardened epoxy.

Having thus described our invention, we claim:

1. An elongated flexible element for bearing tensile loads, said element being formed from a plurality of individual strands including internal strands and external strands, said element having a connector portion defined by said strands at said connector portion being impregnated with a substantially rigid material rendering said strands at said connector portion substantially inflexible, said element having a juncture portion defined by unimpregnated strands merging into said impregnated strands at said connector portion, said juncture portion being impregnated with highly flexible elastomeric material different from said rigid material, said elastomeric material extending throughout said element at said juncture portion and coating both said internal and external strands.

2. The element of claim 1 wherein said strands are woven throughout the length of said element, said strands being unwoven at said connector portion.

3. The element of claim 2 wherein said element has an intersecting portion defined by said woven strands merging with said unwoven strands at said connector portion, said intersecting portion being coincidental with said juncture portion.

4. The element of claim 2 wherein said juncture portion is defined by substantially only woven strands.

5. The element of claim 2 wherein said juncture portion is defined by substantially only unwoven strands.

6. The element of claim 2 wherein said juncture portion is defined by both woven strands and portions of said unwoven strands.

7. The element of claim 1 wherein said element has a substantially uniform cross-section throughout its length and said strands are expanded outwardly at said connector portion into a connector portion cross-section of greater area than said uniform cross-section.

8. The element of claim 7 wherein said element has a terminal end and said connector portion is formed at said terminal end to define a lug and further including a connector member having an outer surface and a socket defining an inner surface, said connector member having an opening extending from said inner surface to said outer surface, said lug being received in said socket and at least a portion of said juncture portion being tightly received in said opening.

9. In a method of molding a connector on an elongated element formed from a plurality of individual strands including internal strands and external strands wherein a connector portion of said element is positioned in a mold and liquid material impregnated into said connector portion is solidified to a substantially rigid state conforming to the shape of said mold, said element having a juncture portion defined by the merger of unimpregnated strands with impregnated strands at said connector portion and said juncture portion extending through a hole in said mold during solidification of said liquid material, the improvement comprising; the step of impregnating said juncture portion with highly flexible elastomeric material in a liquid state and solidifying said elastomeric material prior to solidifying said liquid material, said elastomeric material being different from said liquid material and coating both said external and internal strands, whereby leakage of said liquid material through said hole in said mold along said internal and external strands at said juncture portion is prevented.

10. The method of claim 9 wherein said elastomeric material is impregnated into said juncture portion prior to positioning of said connector portion in said mold and said juncture portion in said hole.

11. The method of claim 10 wherein said elastomeric material is solidified prior to positioning of said connector portion in said mold and said juncture portion in said hole.

12. The method of claim 9 wherein said juncture portion is impregnated with elastomeric material and said elastomeric material is solidified prior to impregnation of said connector portion with said liquid material.

13. The method of claim 12 wherein said connector portion is impregnated with said liquid material prior to positioning of said connector portion in said mold and said juncture portion in said hole.

14. In a method of molding a connector on an elongated element formed from a plurality of individual yarns including internal yarns and external yarns wherein a connector portion of said element is positioned in a mold and liquid material impregnated into said connector portion is solidified to a substantially rigid state conforming to the shape of said mold, said element having a juncture portion defined by the merger of unimpregnated strands with impregnated strands at said connector portion and said juncture portion extending through a hole in said mold during solidification of said liquid material, the improvement comprising; the step of impregnating said juncture portion with non-rigid viscous material in a liquid state prior to solidifying said liquid material, said in said mold during solidification of said liquid material, and coating both said external and internal strands, whereby leakage of said liquid material through said hole in said mold along said internal and external strands at said juncture portion is prevented.

References Cited

UNITED STATES PATENTS

| | | | |
|---|---|---|---|
| 1,408,212 | 2/1922 | Leinbach | 24—123.2UX |
| 1,577,003 | 3/1926 | Sunderland | 24—123.2UX |
| 2,461,031 | 2/1949 | Brickman | 24—123.2UX |
| 2,803,486 | 8/1957 | Larson | 24—123.2UX |
| 3,263,289 | 8/1966 | La Garde | 24—123.2UX |
| 3,264,017 | 8/1966 | La Garde | 24—123.2UX |
| 3,468,569 | 9/1969 | Ballard | 24—123.2UX |

BERNARD A. GELAK, Primary Examiner

U.S. Cl. X.R.

29—461; 287—82